United States Patent [19]

Asano

[11] 4,403,751
[45] Sep. 13, 1983

[54] DEVICE FOR LOCKING WEBBING FOR THE SEAT BELT OF AN AUTOMOTIVE VEHICLE

[75] Inventor: Shuichi Asano, Kawasaki, Japan

[73] Assignee: Nippon Seiko Kabushiki Kaisha, Tokyo, Japan

[21] Appl. No.: 290,085

[22] Filed: Aug. 4, 1981

[30] Foreign Application Priority Data

Aug. 7, 1980 [JP] Japan .............................. 55-108512

[51] Int. Cl.³ ...................... A62B 35/02; B65H 75/48
[52] U.S. Cl. ........................... 242/107.2; 242/107.4 A
[58] Field of Search ................. 242/107.2, 107.4 A, 242/107.4 B; 280/803, 806–808; 297/476–480

[56] References Cited

U.S. PATENT DOCUMENTS

| | | | |
|---|---|---|---|
| 3,817,473 | 6/1974 | Board et al | 242/107.2 |
| 4,206,886 | 6/1980 | Yoshitsugu et al. | 242/107.2 |
| 4,211,377 | 7/1980 | Yasumatsu | 242/107.2 |
| 4,241,886 | 12/1980 | Maekawa et al. | 242/107.2 |
| 4,249,708 | 2/1981 | Asano | 242/107.4 A X |

Primary Examiner—John M. Jillions

Attorney, Agent, or Firm—Wyatt, Gerber, Shoup, Scobey & Badie

[57] ABSTRACT

A device for locking the webbing for the seat belt of an automotive vehicle is provided with a webbing reel biased in a direction to wind the webbing, a drum on which the webbing is partially wound, a drum base supporting the drum and having an axis of rotation eccentric from the axis of rotation of the drum, and a base supporting the reel and drum base. A fixed plate is provided on the base with a sufficient distance with respect to the drum to permit the webbing to pass therethrough, and a sensing device sensing a sudden shock or acceleration or deceleration of the vehicle is also provided. Means are provided for preventing rotation of the reel and the drum when a sudden shock or acceleration or deceleration has been imparted to the vehicle, and means for rotating the drum base at its eccentric axis of rotation to press the drum into contact with the fixed plate and intensely tighten the webbing therebetween is provided to thereby impede the draw-out of the webbing by the tightening thereof. The means for preventing rotation of the drum is fixed to the drum base, and the drum is mounted for movement relative to the drum base.

3 Claims, 10 Drawing Figures

DEVICE FOR LOCKING WEBBING FOR THE SEAT BELT OF AN AUTOMOTIVE VEHICLE

BACKGROUND OF THE INVENTION

1. Field of the Invention

This invention relates to a device for locking the webbing for the seat belt of an automotive vehicle, and an improvement in a device disclosed in the U.S. Pat. No. 4,249,708 granted to the applicant.

2. Description of the Prior Art

It is commonly practised to draw out a seat belt andd wrap it around the seat occupant's body during driving, and it is necessary that when the seat occupant moves his body, the webbing can be drown out further or rewound in such a manner that the seat occupant is not subjected to a strong sense of oppression. However, when a sudden shock or acceleration or deceleration is imparted to the vehicle body to exert a strong force upon the seat occupant, it is necessary that drawing out of the webbing be stopped to prevent the seat occupant from being flung from his seat.

SUMMARY OF THE INVENTION

The present invention intends to provide an inertia device sensing a sudden shock or acceleration or deceleration of the vehicle and operating thereupon to prevent rotation of not only the reel and the drum on which the webbing may be partially wound, but also to prevent the webbing from being further drawn out as it is tightened around the reel during any intense pulling of the webbing as the reel and drum are prevented from rotating.

Therefore, according to the present invention, in addition to means for preventing rotation of the reel, means for preventing rotation of the drum on which the webbing is wound is also provided on a drum base supporting the drum. The drum is made movable relative to the drum base, the drum base is pivotally supported on a base for pivotal movement eccentrically with respect to the drum shaft and, when the webbing is further intensely pulled with the rotation of the reel being prevented, the drum moves relative to the drum base and rotation of the drum is prevented, so that the drum base rotates about its pivot, and the drum is pressed into contact with a fixed plate provided on the base, whereby the webbing is tightened between the drum and the fixed plate, thereby impeding the draw-out of the webbing by the tightening thereof. By such construction, the present invention can reduce the number of parts.

The invention will become more fully apparent from the following detailed description thereof taken in conjunction with the accompanying drawings.

DESCRIPTION OF THE PREFERRED EMBODIMENTS

To make the present invention readily understandable, description will first be made of a seat belt webbing locking device shown in FIGS. 1 to 6 which is the basic form of the present invention.

Figure 1:
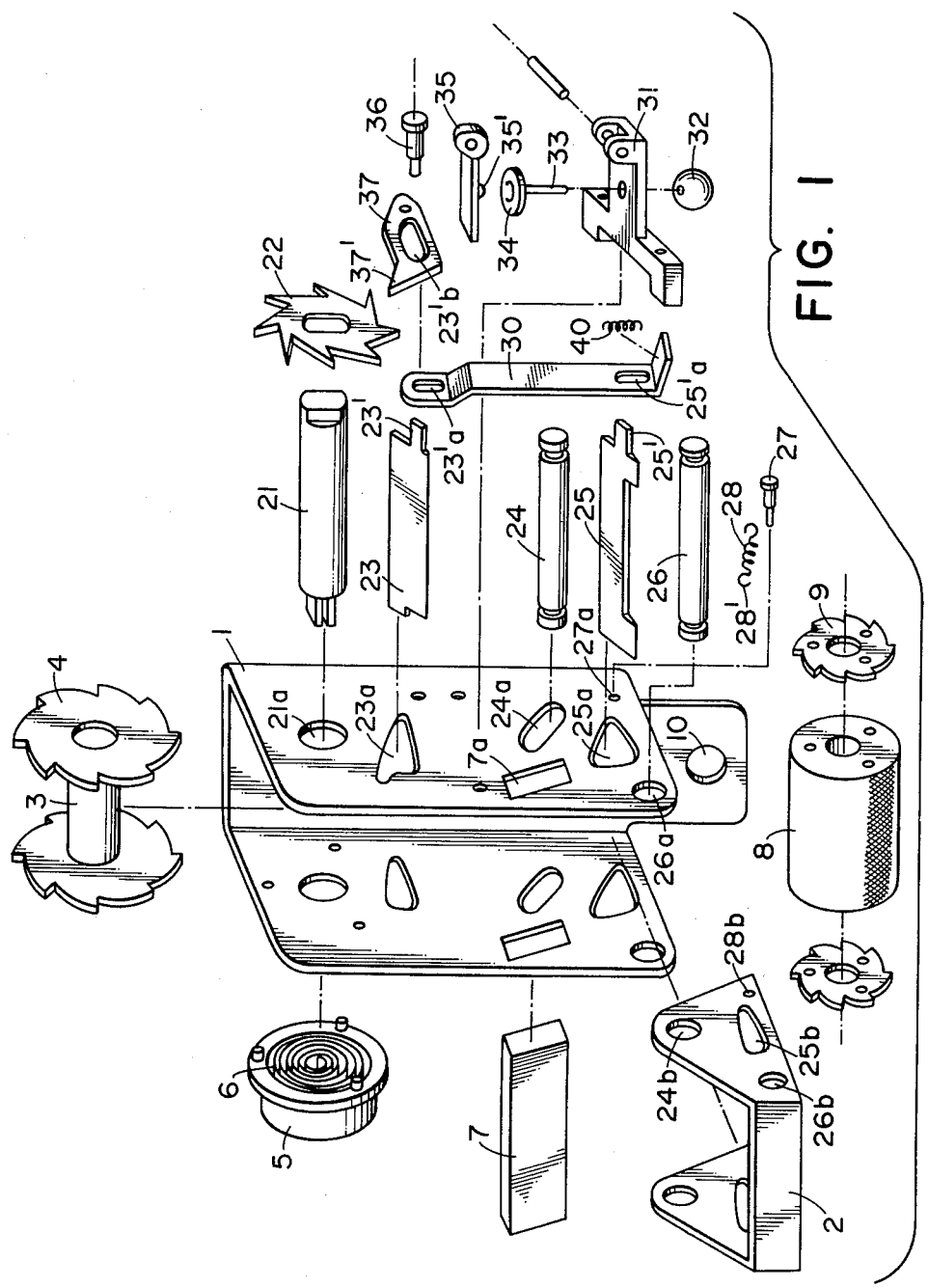
FIG. 1 is an exploded perspective view of the device for locking webbing for the seat belt.

FIG. 1 shows the parts of the device in an exploded manner. Reference numeral 1 designates a base on which various parts are mounted, reference numeral 2 denotes a drum base mounted to the base 1 in an embracing relationship therewith and supporting a drum 8, reference numeral 3 designates a reel for webbing 50, reference numeral 4 denotes first ratchet gears integral with the opposite ends of the reel 3, reference numeral 5 designates a spring case for the reel, reference numeral 6 denotes a take-up spring, reference numeral 7 designates a fixed plate, reference numeral 9 denotes second ratchet gears attached to the opposite ends of the drum 8, and reference numeral 10 designates a hole through which the base 1 is attached to a vehicle body. Reference numeral 21 designates the shaft of the reel, reference numeral 22 denotes an auxiliary ratchet gear fitted to one end of the shaft 21, reference numeral 23 designates a first latching member engageable with the first ratchet gears 4 of the reel, reference numeral 24 denotes a shaft for supporting the drum, reference numeral 25 designates a second latching member engageable with the second ratchet gears 9 secured to the drum 8, reference numeral 26 denotes a shaft for supporting the drum base 2 on the base 1, reference numeral 27 designates a pin for holding one end of a spring 28. The shaft 21 is fitted in holes 21a in the base, and the first latching member 23 is rockably fitted in sector-shaped holes 23a in the base.

Each hole 23a has its upper portion greatly enlarged to enable the latching member 23 to be fitted therein. The fixed plate 7 is fixed within holes 7a, and the drum shaft 24 extends through escape holes 24a in the base and is supported by holes 24b in the drum base.

The second latching member 25 extends through sector-shaped escape holes 25a in the base and is rockably fitted in holes 25b in the drum base, and the drum base shaft 26 extends through holes 26b in the drum base and is supported by holes 26a in the base. The pin 27 is supported by a hole 27a in the base to engage one end of the spring, and the end 28' of the spring 28 is hooked to the lower end 28b of the drum base.

One end of the reel shaft 21 is engaged with the spring 6 in the spring case 5 and the reel is normally biased so that it rotates in a direction to wind the webbing around the reel 3. The auxiliary gear 22 is mounted on the other end of the reel shaft.

The end 23' of the first latching member 23 which is adjacent to the auxiliary gear 22 extends into a hole 23'a located at the upper end of a lever 30, and one end 25' of the second latching member is fitted in a hole 25'a located at the lower end of the lever 30. The end 25' of the second latching member is urged against the upper end of the hole 25'a by a spring 40.

Outside of the lever 30, a pendulum suspending rod 33 having attached thereto a pendulum 32 as shock sensing means is supported by a supporting bed 31, a lever 35 having a projection 35' in the lower portion thereof is provided on the flat head 34 of the rod 33, an auxiliary pawl 37 rockably supported by a pin 36 is further provided on the lever 35, and the end 23' of the first latching member extends through the hole 23'a in the lever 30 and into a hole 23'b in the auxiliary pawl 37.

In the foregoing, an embodiment using a sensing device utilizing a pendulum as the means for sensing shocks or the like has been described, but use may also be made of other sensing device such as a sensing device utilizing a standing type weight or a sensing device utilizing a steel ball contained in a void having a slanting surface.

On the other hand, instead of a sensing device which senses a sudden shock or acceleration or deceleration of the vehicle, use may be made of a sensing device which senses a sudden draw-out force of the webbing.

Figure 2:
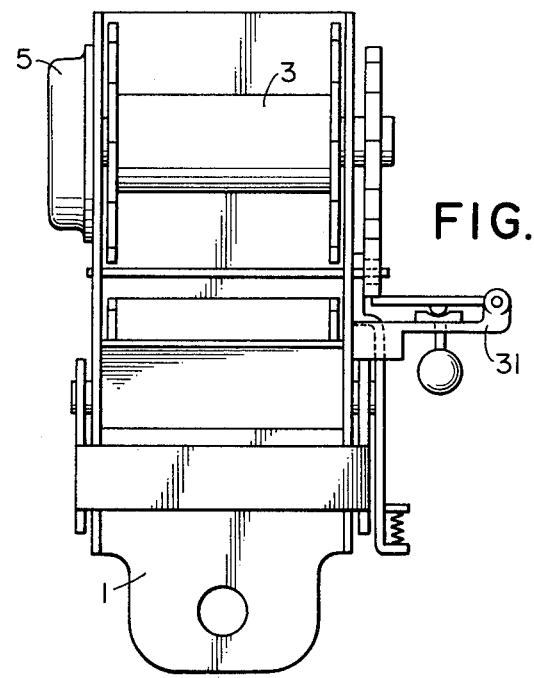
FIG. 2 is a front view of the device as assembled.
Figure 3:
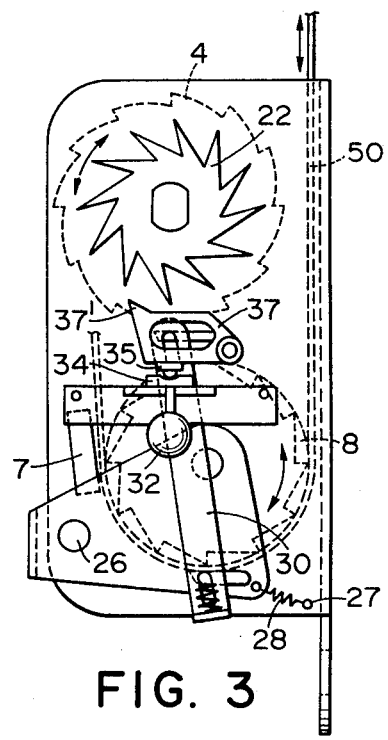
FIG. 3 is a side view thereof.

FIGS. 2 and 3 show the device as assembled, FIG. 2 being a front view and FIG. 3 being a side view of the device as seen from that side on which the auxiliary gear, the pendulum device, etc. exist.

FIGS. 2 and 3 illustrate a position in which the lock mechanism is not operated. The webbing 50 drawn out from the reel 3 passes partially around the drum 8 and extends upwardly, and the pendulum 32 depends vertically from the pendulum supporting bed 31 mounted at the center, with the lever 35 extending horizontally and the drum 8 being spaced apart from the fixed plate 7, so that if the seat occupant moves his body without the movement of the webbing being impeded, the webbing is correspondingly drawn out or rewound.

Figure 4:
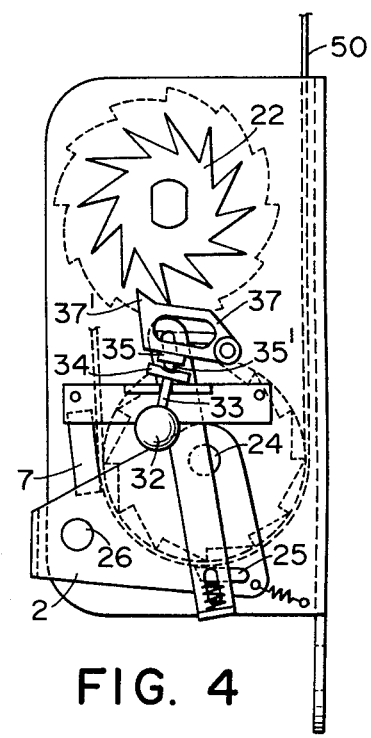
FIGS. 4, 5 and 6 illustrate the sequence in which the webbing is locked.
Figure 5:
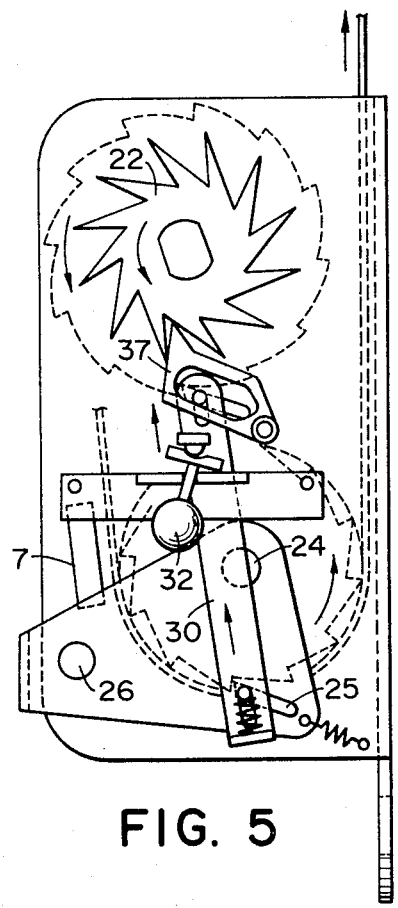
Figure 6:
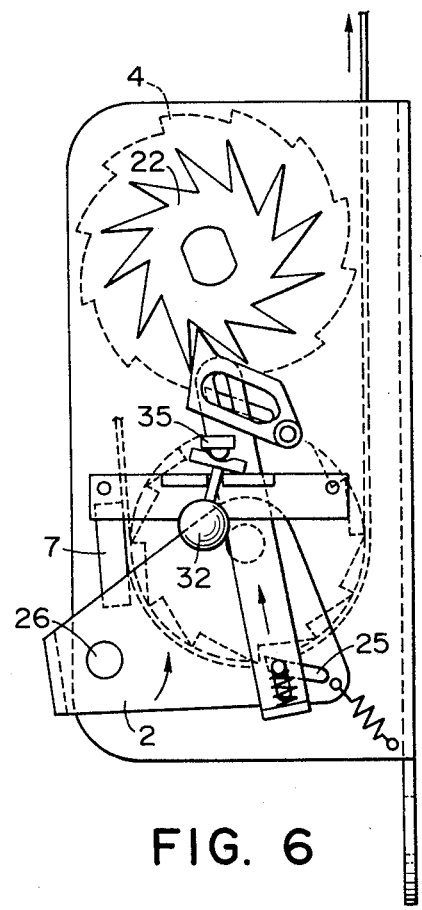

FIG. 4 illustrates a position in which a sudden shock or acceleration or deceleration has been imparted to the vehicle body. The pendulum 32 swings, the rod 33 becomes inclined, the flat head 34 thereof pushes the lever 35 through the projection 35', and the lever is raised upwardly to cause the auxiliary pawl 37 attached to the upper portion thereof to rock upwardly. Thereupon, the end 37' of the pawl slightly comes between adjacent teeth of the auxiliary gear 22. When the occupant's body is intensely pulled by the shock, the webbing tends to be suddenly drawn out from the reel, but the reel is rotated and accordingly the auxiliary gear is also rotated, whereupon the auxiliary pawl 37 with its end 37' which having slightly come between the teeth of the auxiliary gear is pulled away from the lever 35 by the teeth of the rotating auxiliary gear and rocks further upwardly. The auxiliary pawl thus moves deeply between the teeth of the auxiliary gear, thus bringing about the position of FIG. 5. Thereupon, the end 23' of the first latching member 23 which has come into the hole 23' in the auxiliary pawl 37 is also raised upwardly and the latching member 23 rotates in the sector-shaped hole 23a and comes inbetween the teeth of the first gears 4 on the opposite ends of the reel to impede counter-clockwise rotation of the reel.

When the end 23' is raised upwardly, the lever 30 is also raised upwardly. Thereupon, since the end 25' of the second latching member 25 is in the hole 25'a at the lower end of the lever 30, the second latching member 25 also rotates in the escape hole 25a in the base and in the sector-shaped hole 25b in the drum base and comes between adjacent teeth of the second gears 9 on the opposite ends of the drum 8, thus impeding counter-clockwise rotation of the drum 8 also.

Since, however, the webbing is intensely pulled, tightening occurs at the reel and the webbing tends to be drawn out by an amount corresponding to the tightening and, therefore, the fixed plate 7 and the drum 8 are pressed into contact with each other to thereby impede such draw-out of the webbing. That is, when the rotation of both the reel 3 and the drum 8 is impeded as described above, if the webbing 50 is pulled rightwardly and upwardly, as viewed in the figure, the drum 8 and the drum base 2 supporting the drum will be rotated counter-clockwisely about the drum base shaft 26 against the force of the spring 28. The shaft 24 of the drum 8 will pass through the escape hole 24a in the base and slide within the hole 24b of the drum base, so that the drum 8 will be pressed into contact with the fixed plate 7, thus bringing about the position of FIG. 6. Therefore, the webbing drawn out from the reel and wound on the drum 8 will be held tightly between the fixed plate 7 and the drum 8 and thus, the draw-out of the webbing by the tightening at the reel will be prevented.

The present invention is an improvement in the means for impeding the rotation of the drum 8 and intends to impede the rotation of the drum by an impeding device fixed to the drum base itself with the second latching member 25, lever 30, etc. being omitted.

Figure 7:
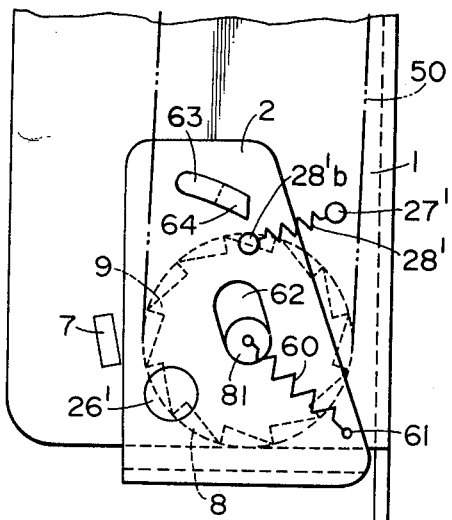
FIG. 7 is a side view of a first embodiment of the present invention.
Figure 8:
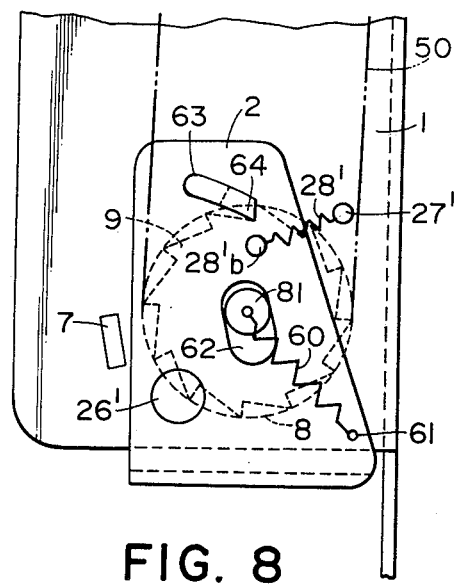
FIG. 8 illustrates the operative condition thereof.

FIG. 7 is a side view of a first embodiment of the drum rotation impeding device according to the present invention, and FIG. 8 shows the device in its operating condition. In the present invention, the drum base 2 is pivotally mounted on the base 1 at a pivot 26'. The drum base is pulled rightwardly or clockwise by a spring 28' as viewed in the figure. The spring 28' is restained on the drum base 2 at a hole 28'b and restrained on the base 1 by a restraining portion 27'. The drum 8 has its shaft 81 fitted in the slot 62 in the drum base and is normally biased downwardly by a spring 60 attached to the shaft. The spring 60 is secured to a restraining portion 61 on the drum base. Designated by 63 is a tooth fixed to the drum base, and the tip 64 of the tooth is adapted to mesh with the gears 9 fixed to the opposite ends of the drum during operation. Designated by 7 and 50 are the fixed plate and the webbing, respectively, as previously noted.

As already described, when there is a sudden speed change in the vehicle and the inertia member is operated to impede the rotation of the reel 3 of the webbing, the seat occupant will be flung away forwardly, so that the webbing will be pulled to raise the drum 8 upwardly and the drum 8 will move against the force of the spring 60 by the shaft 81 sliding along the slot 62 in the drum base and, as shown in FIG. 8, the gears 9 fixed to the opposite ends of the drum 8 will mesh with the tooth tip 64 of the tooth 63 fixed to the inner side of the drum base, thus impeding rotation of the drum 8. Rotation of both the reel 3 and the drum 8 will thus be impeded and, when the webbing tends to be further drawn out and pulled rightwardly and upwardly as viewed in the figure, as previously described, the drum base 2 and the drum 8 will rotate counter-clockwisely about the pivot 26' located eccentrically with respect to the drum shaft against the force of the spring 28' to press the drum 8 into contact with the fixed plate 7, thus impeding further draw-out of the webbing by tightening around the reel 3.

Figure 9:
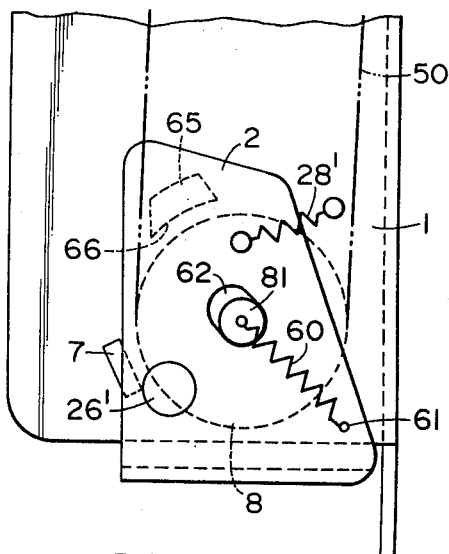
FIG. 9 is a side view of a second embodiment.
Figure 10:
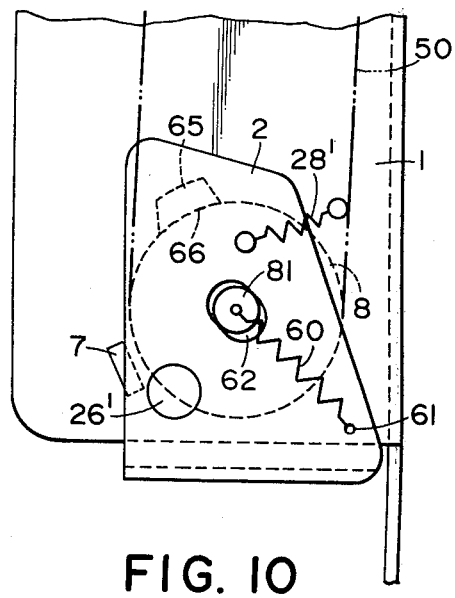
FIG. 10 illustrates the operative condition thereof.

FIG. 9 shows a second embodiment of the present invention. In FIG. 9, reference characters similar to those in FIG. 7 designate similar parts. In this second embodiment, the drum 8 has no ratchet gears and, inside the drum base 2, a friction engaging member 65 is fixed instead of a tooth, and as shown in FIG. 10, when the inertia member is operated and the shaft 81 of the drum 8 moves in the slot 62 in the drum base whereby the drum 8 moves upwardly as mentioned previously, it will engage the friction surface of the friction engaging member 65, thus impeding rotation of the drum 8. At the same time, the drum base will rotate counter-clockwisely against the force of the spring 28' to press the webbing 50 between the fixed plate 7 and the drum 8, thereby impeding draw-out of the webbing 50. To ensure the engagement between the drum 8 and the friction surface, one or both of them may, of course, be provided with concavo-convexity, knurling or engaging teeth.

I claim:

1. In a device for locking the webbing for a seat belt of an automotive vehicle, said device including a reel adapted to have the webbing of the seat belt wound therearound and biased in a direction to wind the webbing therearound, a rotatable drum spaced from said reel and adapted to have the webbing wound at least partially therearound, a drum base supporting said drum and adapted to pivot about an axis eccentric from the axis of rotation of said drum, a base supporting said reel and said drum base, a fixed plate provided on said base with a sufficient distance with respect to said drum to permit the webbing to pass therethrough, means for sensing an emergency condition of the vehicle, means responsive to said sensing means for preventing rotation of said reel and said drum when an emergency condition of the vehicle is sensed by said sensing means, said drum base being adapted to pivot about its eccentric axis to press said drum into contact with said fixed plate and hold the webbing tightly therebetween when the rotation of said reel and said drum is prevented to thereby impede the the webbing from being drawn from said reel by the tightening thereof therearound, the improvement residing in that said means for preventing rotation of said drum is fixed to said drum base, and said drum is mounted for movement relative to said drum base.

2. A device according to claim 1, said preventing means including a ratchet gear adapted to rotate unitarily with said drum and a tooth fixed to said drum base and adapted to mesh with said ratchet gear.

3. A device according to claim 1, wherein said preventing means includes a friction engaging member fixed to said drum base and adapted to be urged against said drum to prevent rotation of the drum.

* * * * *